(12) United States Patent
Klasen-Memmer et al.

(10) Patent No.: US 6,790,489 B2
(45) Date of Patent: Sep. 14, 2004

(54) LIQUID-CRYSTALLINE MEDIUM

(75) Inventors: Melanie Klasen-Memmer, Heuchelheim (DE); Eike Poetsch, Muehltal (DE); Volker Reiffenrath, Rossdorf (DE)

(73) Assignee: Merck Patent GmbH, Darmstadt (DE)

(*) Notice: Subject to any disclaimer, the term of this patent is extended or adjusted under 35 U.S.C. 154(b) by 0 days.

(21) Appl. No.: 10/662,461

(22) Filed: Sep. 16, 2003

(65) Prior Publication Data

US 2004/0058158 A1 Mar. 25, 2004

(30) Foreign Application Priority Data

Sep. 17, 2002 (DE) .......................... 102 42 979

(51) Int. Cl.$^7$ ..................... C09K 19/32; C09K 19/34
(52) U.S. Cl. .............. 428/1.1; 252/299.61; 252/299.62; 252/299.63
(58) Field of Search ..................... 428/1.1; 252/299.61, 252/299.62, 299.63; 549/13, 14, 20, 356, 369; 585/360

(56) References Cited

FOREIGN PATENT DOCUMENTS

DE          4235975      *    4/1994

OTHER PUBLICATIONS

English abstract DE 4235975, 1994.*
Geivandov et al., "Liquid–crystalline compounds containing tricyclo(4.4.0.0.)–decane(twistane) and spiro93.3)heptane ring systems", Liquid Crystals, 1987, vol. 2, p. 235–239.*
Chan et al. "Synthesis and Liquid Crystal Properties of Dimethyl Linked Compounds Incorporating the Cyclobutane or Spiro[3.3]Heptane Rings", Mol. Cryst. Liq. Cryst., 1989, vol. 168, pp. 229–245.*
Chan et al. "Synthesis and Liquid Crystal Properties of Compounds Incorporating the Cyclobutane, Spiro[3.3]heptane and Dipiro[3.1.3.1]Decane Rings", Mol. Cryst. Liq. Cryst., 1987, vol. 147, pp. 113–139.*

* cited by examiner

*Primary Examiner*—Shean C. Wu
(74) *Attorney, Agent, or Firm*—Millen, White, Zelano & Branigan, P.C.

(57) ABSTRACT

The invention relates to a liquid-crystalline medium based on a mixture of polar compounds of negative dielectric anisotropy which comprises at least one compound of the formula I

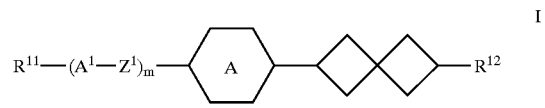

in which $R^{11}$, $R^{12}$, $A^1$, $Z^1$, ring A and m are as defined in claim 1, and to the use thereof for an active matrix display based on the ECB or IPS effect.

16 Claims, No Drawings

LIQUID-CRYSTALLINE MEDIUM

The invention relates to a liquid-crystalline medium based on a mixture of polar compounds of negative dielectric anisotropy which comprises at least one compound of the formula I

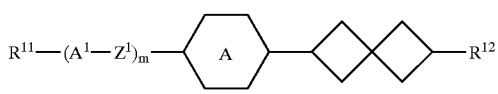

in which $R^{11}$ is an alkyl or alkenyl radical having up to 15 carbon atoms which is unsubstituted, monosubstituted by CN or $CF_3$ or at least monosubstituted by halogen, where, in addition, one or more $CH_2$ groups in these radicals may be replaced by —O—, —S—,

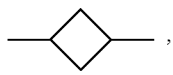

—C≡C—, —CO—O— or —O—CO— in such a way that O atoms are not linked directly to one another, $A^1$
a) is a 1,4-cyclohexenylene or 1,4-cyclohexylene radical, in which one or two non-adjacent $CH_2$ groups may be replaced by —O— or —S—,
b) a 1,4-phenylene radical, in which one or two CH groups may be replaced by N,
c) a radical from the group consisting of piperidine-1,4-diyl, 1,4-bicyclo[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl,
where the radicals a), b) and c) may be monosubstituted or polysubstituted by halogen atoms,

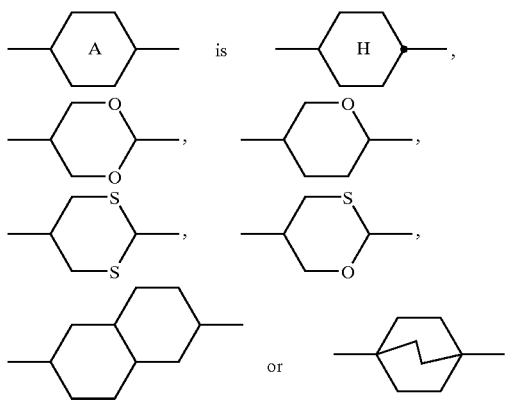

$Z^1$ is —CO—O—, —O—CO—, —$CF_2$O—, —O$CF_2$—, —$CH_2$O—, —O$CH_2$—, —$CH_2CH_2$—, —$(CH_2)_4$—, —$C_2F_4$—, —$CH_2CF_2$—, —$CF_2CH_2$—, —CF=CF—, —CH=CF—, —CF=CH—, —CH=CH—, —C≡C— or a single bond,
$R^{12}$ is alkenyl having 2–7 carbon atoms, and
m is 0, 1 or 2.

Media of this type can be used, in particular, for electro-optical displays having active matrix addressing based on the ECB effect and for IPS (in-plane switching) displays.

The principle of electrically controlled birefringence, the ECB effect or DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline phases must have high values for the ratio of the elastic constants K3/K1, high values for the optical anisotropy Δn, and values for the dielectric anisotropy Δε of from −0.5 to about −5 in order to be suitable for high-information display elements based on the ECB effect. Electro-optical display elements based on the ECB effect have a homeotropic edge alignment. Dielectrically negative liquid-crystal media can also be used in displays which use the so-called IPS effect.

Industrial use of this effect in electro-optical display elements requires LC phases which have to meet a multiplicity of requirements. Particularly important here are the chemical resistance to moisture, air and physical influences, such as heat, radiation in the infrared, visible and ultraviolet region and direct and alternating electric fields.

LC phases that can be used in industry are furthermore required to have a liquid-crystalline mesophase in a suitable temperature range and low viscosity.

None of the series of compounds having a liquid-crystalline mesophase that have been disclosed hitherto includes an individual compound which meets all these requirements. In general, therefore, mixtures of from two to 25, preferably from three to 18, compounds are prepared in order to obtain substances that can be used as LC phases. However, it has not been possible to prepare optimum phases easily in this way, since no liquid-crystal materials of significantly negative dielectric anisotropy and adequate stability were available hitherto.

Matrix liquid-crystal displays (MLC displays) of this type are known. Non-linear elements which can be used for individual switching of the individual pixels are, for example, active elements (i.e. transistors). The term "active matrix" is then used, where a distinction can be made between two types:
1. MOS (metal oxide semiconductor) transistors on a silicon wafer as substrate.
2. Thin-film transistors (TFTs) on a glass plate as substrate.

In type 1, the electro-optical effect used is usually dynamic scattering or the guest-host effect. The use of single-crystal silicon as substrate material restricts the display size, since even modular assembly of various part-displays results in problems at the joints.

In the case of the more promising type 2, which is preferred, the electro-optical effect used is usually the TN effect.

A distinction is made between two technologies: TFTs comprising compound semiconductors, such as, for example, CdSe, or TFTs based on polycrystalline or amorphous silicon. The latter technology is being worked on intensively worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully color-capable displays, in which a mosaic of red, green and blue filters is generally arranged in such a way that a filter element is opposite each switchable pixel.

The TFT displays known to date usually operate as TN cells with crossed polarizers in transmission and are back-lit.

The term MLC displays here covers any matrix display with integrated non-linear elements, i.e., besides the active matrix, also displays with passive elements, such as varistors or diodes (MIM=metal-insulator-metal).

MLC displays of this type are particularly suitable for TV applications (for example pocket TVs) or for high-information displays in automobile or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, Sep. 1984: A 210–288 Matrix LCD Controlled by Double Stage Diode Rings, p. 141 ff, Paris; STROMER, M., Proc. Eurodisplay 84, September. 1984: Design of Thin Film Transistors for Matrix Addressing of Television Liquid Crystal Displays, p. 145 ff, Paris]. With decreasing resistance, the contrast of an MLC display deteriorates. Since the specific resistance of the liquid-crystal mixture generally drops over the life of an MLC display owing to interaction with the interior surfaces of the display, a high (initial) resistance is very important for displays that have to have acceptable resistance values over a long operating period.

The disadvantage of the MLC-TN displays disclosed hitherto is based on their comparatively low contrast, the relatively high viewing-angle dependence and the difficulty in producing gray shades in these displays.

EP 0 474 062 discloses MLC displays based on the ECB effect. The LC mixtures described therein are based on 2,3-difluorophenyl derivatives which contain an ester, ether or ethyl bridge and have low values for the voltage holding ratio (HR) after exposure to UV.

There thus continues to be a great demand for MLC displays having very high specific resistance at the same time as a large working-temperature range, short response times and low threshold voltage with the aid of which various gray shades can be produced.

The invention has an object of providing MLC displays which are based on the ECB or IPS effect, which do not have the above-mentioned disadvantages or only do so to a reduced extent, and at the same time have very high specific resistance values.

Upon further study of the specification and appended claims, further objects and advantages of this invention will become apparent to those skilled in the art.

It has now been found that these objects can be achieved if nematic liquid-crystal mixtures which comprise at least one compound of the formula I are used in these display elements.

The invention thus relates to a liquid-crystalline medium based on a mixture of polar compounds of negative dielectric anisotropy which comprises at least one compound of the formula I above.

The mixtures according to the invention exhibit very favorable values for the capacitive threshold, relatively high values for the holding ratio and at the same time very good low-temperature stability as well as very low rotational viscosities.

Some preferred embodiments are mentioned below:

a) Liquid-crystalline medium which additionally comprises one or more compounds of the formula II

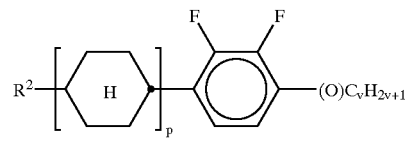

in which
R² is as defined for R¹¹,
p is 1 or 2, and
v is from 1 to 6.

b) Liquid-crystalline medium which additionally comprises one or more compounds of the formula III

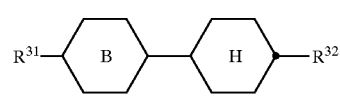

in which
$R^{31}$ and $R^{32}$ are each, independently of one another, a straight-chain alkyl, alkenyl, alkenyloxy or alkoxy radical having up to 12 carbon atoms, and

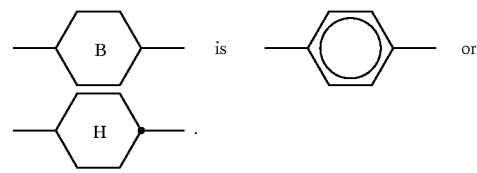

c) Liquid-crystalline medium which comprises one, two, three, four or more, preferably one or two, compounds of the formula I.

d) Liquid-crystalline medium in which R11 in the formula I is preferably defined as follows: straight-chain alkyl, vinyl, 1E-alkenyl or 3-alkenyl. $R^{12}$ is preferably $CH_2=CH$, $CH_3—CH=CH$, $C_3H_7—CH=CH$, $CH_2=CH—C_2H_4$ or $CH_3—CH=CH—C_2H_4$.

e) Liquid-crystalline medium in which the proportion of compounds of the formula I in the mixture as a whole is at least 5% by weight, preferably at least 10% by weight.

f) Liquid-crystalline medium in which the proportion of compounds of the formula II in the mixture as a whole is at least 20% by weight.

g) Liquid-crystalline medium in which the proportion of compounds of the formula III in the mixture as a whole is at least 5% by weight.

h) Liquid-crystalline medium which comprises at least one compound selected from the sub-formulae I1 to I8:

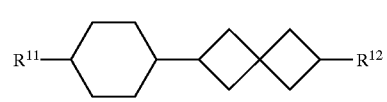

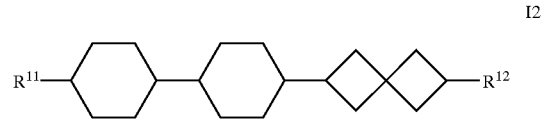

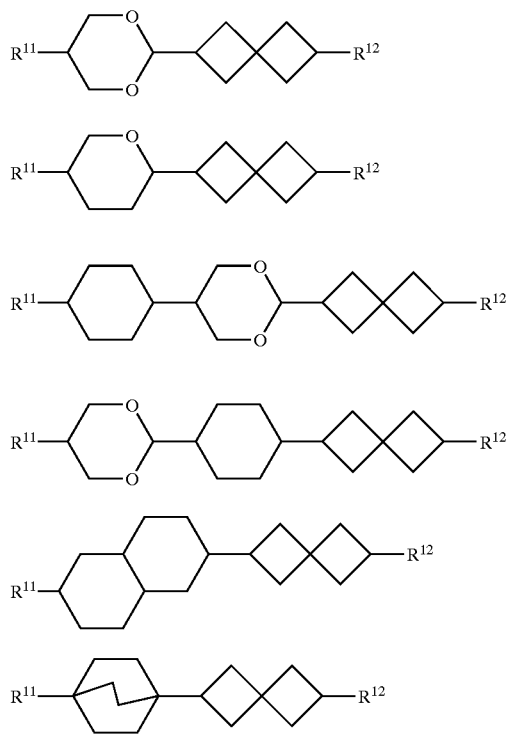

Particularly preferred media comprise one or more compounds selected from the group consisting of the compounds of the formulae

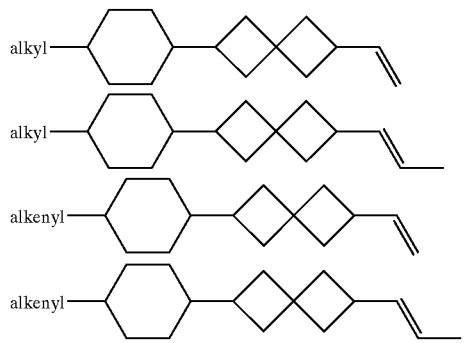

i) Liquid-crystalline medium which additionally comprises a compound selected from the formulae IIIa to IIIf:

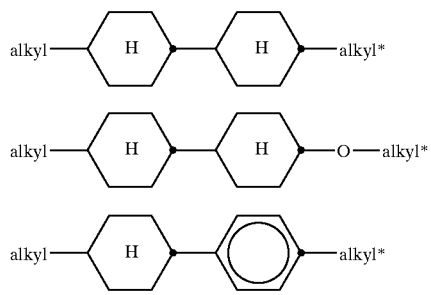

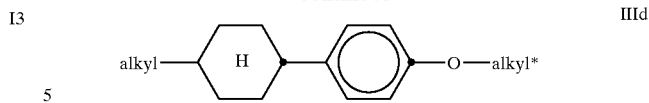

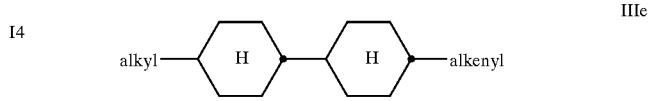

in which
alkyl and alkyl* are each, independently of one another, a straight-chain alkyl radical having 1–6 carbon atoms, and
alkenyl and alkenyl* are each, independently of one another, a straight-chain alkenyl radical having 2–6 carbon atoms.

The medium according to the invention preferably comprises at least one compound of the formula IIIa, formula IIIb and/or formula IIIe, furthermore IIIf.

Particularly preferred compounds of the formulae IIIe and IIIf are mentioned below:

j) Liquid-crystalline medium which essentially consists of:
5–30% by weight of one or more compounds of the formula I1 and
20–70% by weight of one or more compounds of the formula II.

k) Liquid-crystalline medium which additionally comprises one or more compounds of the formulae

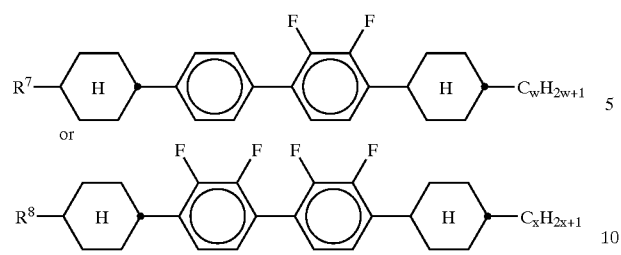
in which
R[7] and R[8] each, independently of one another, have one of the meanings indicated for R[11] above, and
w and x are each, independently of one another, from 1 to 6.
l) Liquid-crystalline medium which additionally comprises one or more compounds of the formulae IVa to IVt
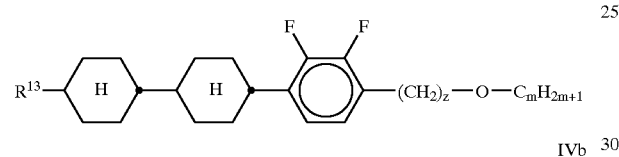
IVa
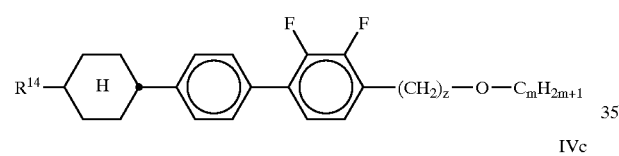
IVb
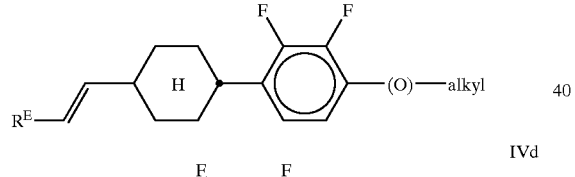
IVc
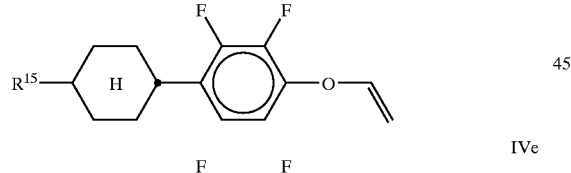
IVd
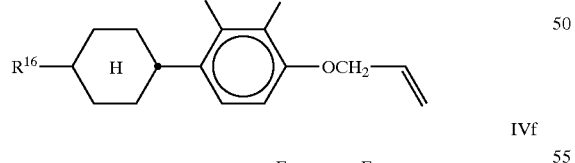
IVe
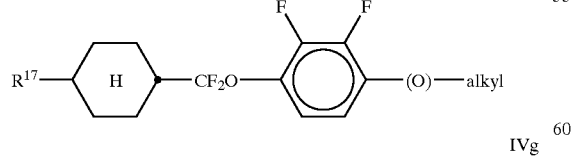
IVf
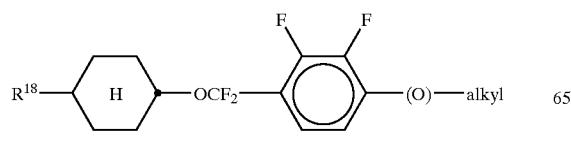
IVg
-continued
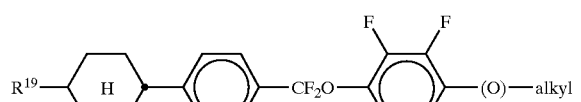
IVh
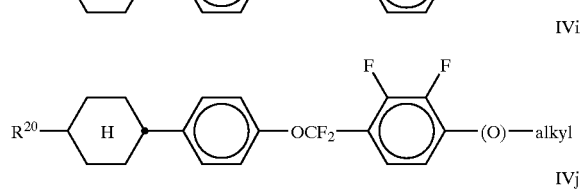
IVi
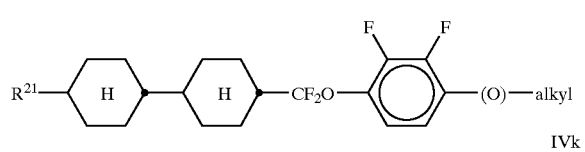
IVj
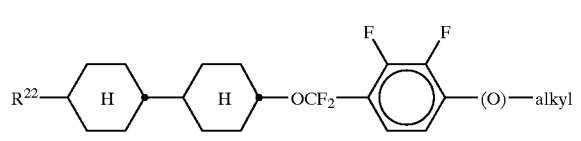
IVk
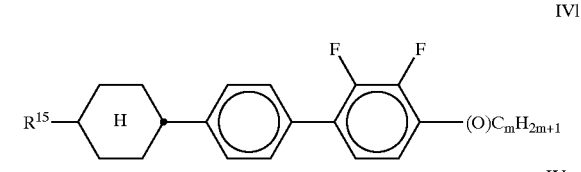
IVl
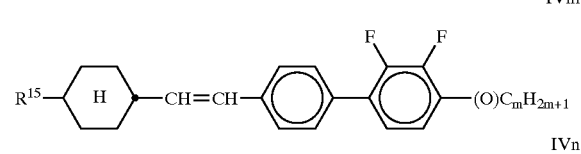
IVm
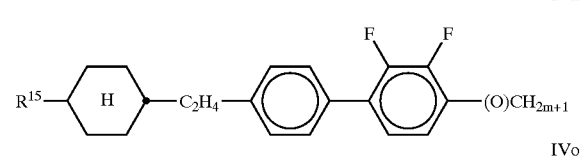
IVn
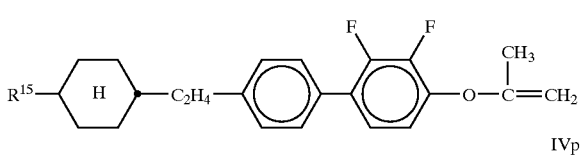
IVo
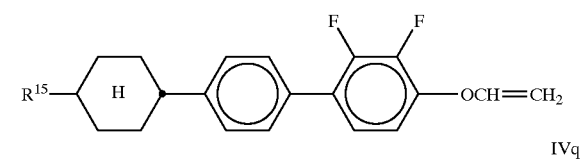
IVp
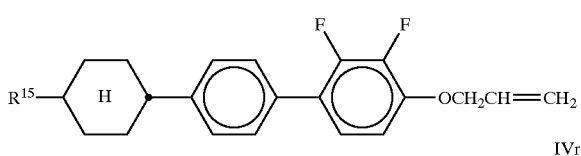
IVq
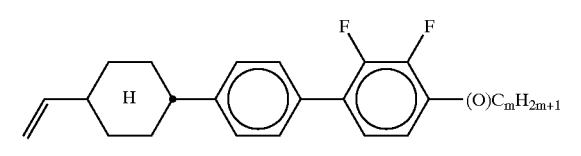
IVr -continued

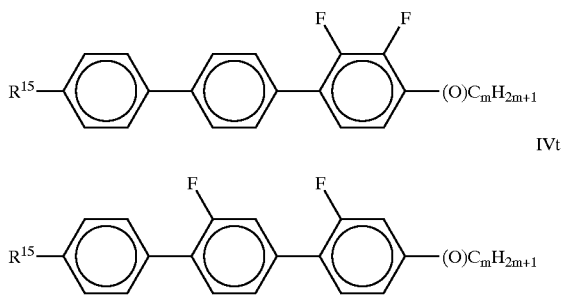

in which $R^{13}$–$R^{22}$ are each, independently of one another, as defined for $R^{11}$, $R^{12}$ or $R^{21}$, and z and m are each, independently of one another, 1–6. z may also be 0. $R^E$ is H, $CH_3$, $C_2H_5$ or n—$C_3H_7$.

m) Liquid-crystalline medium comprising one or more compounds of the formula IVa, IVg, IVs or IVt.

n) Liquid-crystalline medium additionally comprising one or more compounds of the formula

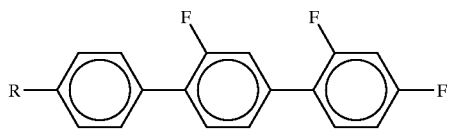

in which R is alkyl, alkenyl, alkoxy or alkenyloxy having from 1 or 2 to 6 carbon atoms respectively.

The invention furthermore relates to an electro-optical display having active matrix addressing based on the ECB effect, characterized in that it comprises, as dielectric, a liquid-crystalline medium as described above.

The liquid-crystal mixture preferably has a nematic phase range of at least 60 K and a flow viscosity v20 of at most 30 mm2·s−1 at 20° C.

The liquid-crystal mixture according to the invention preferably has a Δε of from about −0.5 to −6.0, in particular from about −3.0 to −4.5, where Δε denotes the dielectric anisotropy. The rotational viscosity γ1 is preferably <150 mPa·s, in particular <140 mPa·s.

The birefringence Δn in the liquid-crystal mixture is preferably between 0.07 and 0.15, more preferably between 0.08 and 0.12, and/or the dielectric constant εII is preferably greater than or equal to 3, more preferably from 3.2 to 8.5.

The dielectrics may also comprise further additives which are known to the person skilled in the art and are described in the literature.

For example, 0–15% of pleochroic dyes may be added, furthermore conductive salts, preferably ethyldimethyldodecylammonium 4-hexoxybenzoate, tetrabutylammonium tetraphenylboronate or complex salts of crown ethers (cf., for example, Haller et al., *Mol. Cryst. Liq. Cryst.* Volume 24, pages 249–258 (1973)) can be added in order to improve the conductivity or substances can be added for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

Dopants which can be added to the mixtures according to the invention are indicated below:

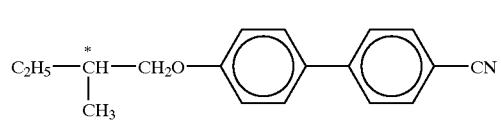
C 15

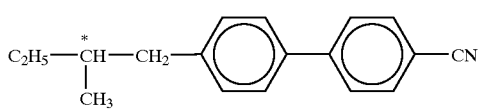
CB 15

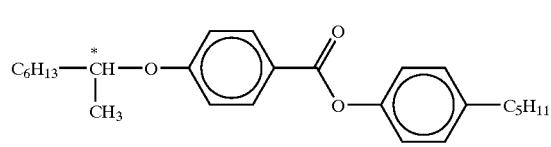
CM 21

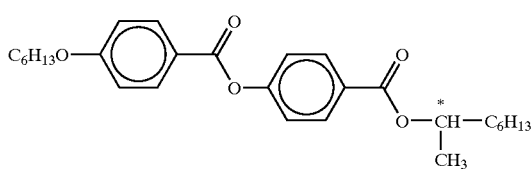
R/S-811

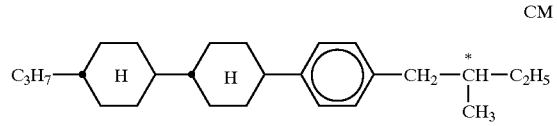
CM 44

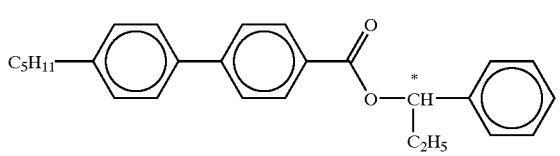
CM 45

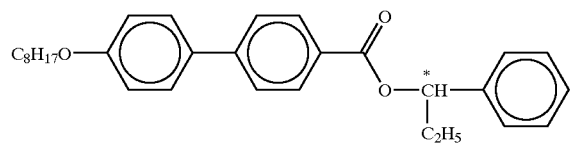
CM 47

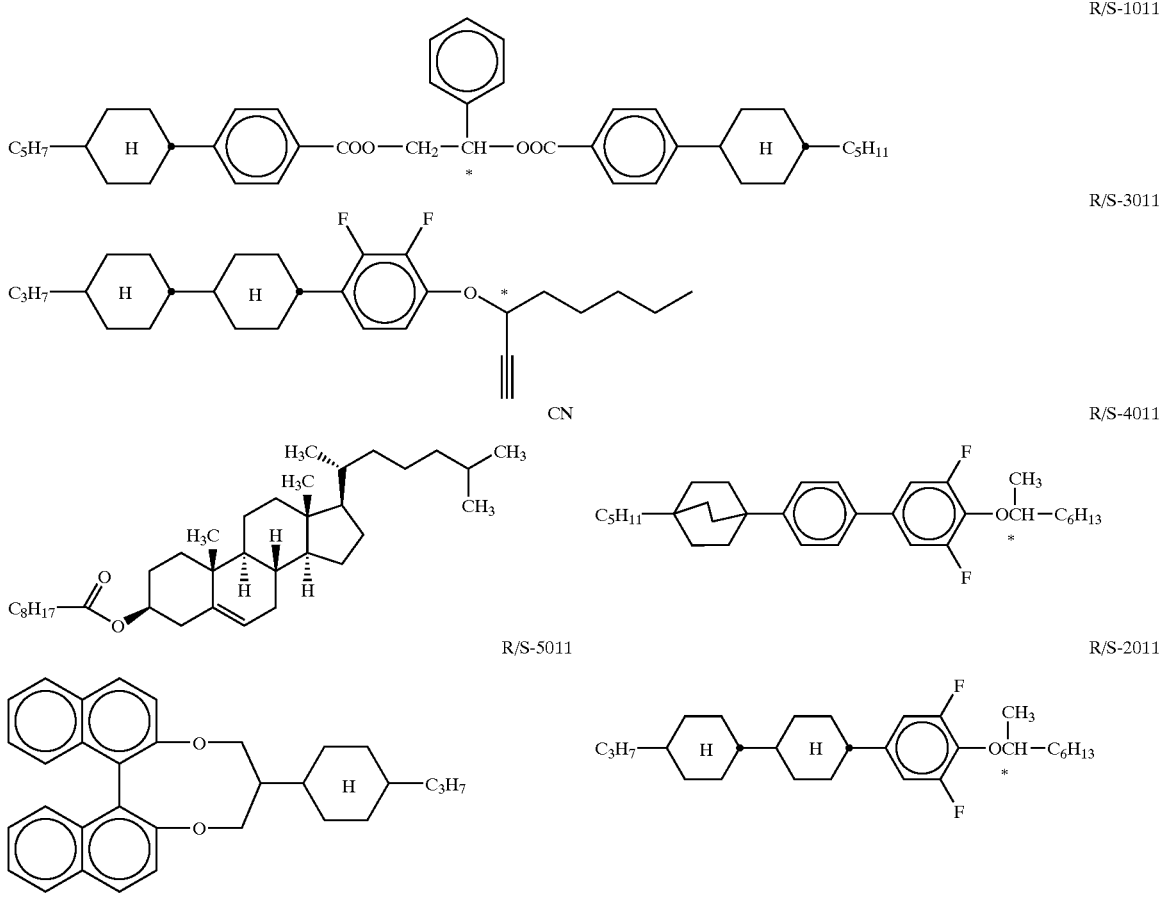

The individual components of the formulae I, II, III and IV of the liquid-crystal phases according to the invention are either known or their methods of preparation can easily be derived from the prior art by the person skilled in the relevant art since they are based on standard methods described in the literature.

The nematic liquid-crystal mixtures in the displays according to the invention generally comprise two components A and B, which themselves consist of one or more individual compounds.

Component A has significantly negative dielectric anisotropy and gives the nematic phase a dielectric anisotropy of $\leq -0.3$. It preferably comprises compounds of the formulae I and II and/or IV.

The proportion of component A is preferably between 45 and 100% by weight, in particular between 60 and 100% by weight.

For component A, one (or more) individual compound(s) which have a value of $\Delta\epsilon$ of $\leq -0.8$ is (are) preferably selected. This value must be more negative the smaller the proportion of A in the mixture as a whole.

Component B has pronounced nematogeneity and a flow viscosity of not greater than 30 mm2·s−1, preferably not greater than 25 mm2·s−1, at 20° C.

Particularly preferred individual compounds of component B are extremely low-viscosity nematic liquid crystals having a flow viscosity of not greater than 18 mm2. s−1, preferably not greater than 12 mm2. s−1, at 20° C.

Component B is monotropically or enantiotropically nematic, has no smectic phases and is able to prevent the occurrence of smectic phases down to very low temperatures in liquid-crystal mixtures. For example, if various materials of high nematogeneity are added to a smectic liquid-crystal mixture, the nematogeneity of these materials can be compared through the degree of suppression of smectic phases that is achieved.

A multiplicity of suitable materials is known to the person skilled in the art from the literature. Particular preference is given to compounds of the formula III.

In addition, these liquid-crystal phases may also comprise more than 18 components, preferably from 18 to 25 components.

The phases preferably comprise from 4 to 15, in particular from 5 to 12, compounds of the formulae I, II and optionally III.

Besides compounds of the formulae I, II and III, other constituents may also be present, for example in an amount of up to 45% by weight of the mixture as a whole, but preferably up to a maximum of 35% by weight, in particular up to a maximum of 10% by weight.

The other constituents are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexyl-pyrimidines, phenyl- or cyclohexyldioxanes, optionally halogenated stilbenes, benzyl phenyl ethers, tolans and substituted cinnamic acids.

The most important compounds which are suitable as constituents of liquid-crystal phases of this type can be characterized by the formula V $$R^9\text{—L—G—E—}R^{10} \qquad V$$

in which
L and E are each a carbocyclic or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, tetrahydropyran rings, 2,6-disubstituted naphthalene, di- and tetrahydronaphthalene, quinazoline and tetrahydroquinazoline,

| G is | —CH=CH— | —N(O)=N— |
| --- | --- | --- |
| | —CH—CQ— | —CH=N(O)— |
| | —C≡C— | —CH$_2$—CH$_2$— |
| | —CO—O— | —CH$_2$—O— |
| | —CO—S— | —CH$_2$—S— |
| | —CH=N— | —COO-Phe-COO— |
| | —CF$_2$O— | —CF=CF— | or a C—C single bond, Q is halogen, preferably fluorine or chlorine, or —CN, and $R^9$ and $R^{10}$ are each alkyl, alkenyl, alkoxy, alkenyloxy, alkanoyloxy or alkoxycarbonyloxy having up to 18, preferably up to 8, carbon atoms, or one of these radicals is alternatively CN, NC, NO$_2$, NCS, CF$_3$, F, Cl or Br.

In most of these compounds, R9 and R10 are different from one another, one of these radicals usually being an alkyl, alkenyl or alkoxy group. Other variants of the proposed substituents are also common. Many such substances or also mixtures thereof are also commercially available. All these substances can be prepared by methods known from the literature.

It goes without saying to the person skilled in the art that the ECB mixture according to the invention may also comprise compounds in which, for example, H, N, O, Cl and F have been replaced by the corresponding isotopes.

The construction of the liquid-crystal displays according to the invention corresponds to the usual geometry, as described, for example, in EP-A 0 240 379.

The entire disclosure of all applications, patents and publications, cited herein and of corresponding German application No. 10242979.0, filed Sep. 17, 2002 is incorporated by reference herein.

The following examples are intended to explain the invention without limiting it. Above and below, percentages are per cent by weight; all temperatures are indicated in degrees Celsius.

Besides the compounds of the formula I, the mixtures according to the invention preferably comprise one or more compounds of the compounds mentioned below.

The following abbreviations are used:

PCH-nOmFF

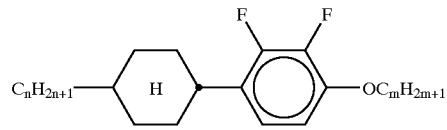

CCP-nOmFF

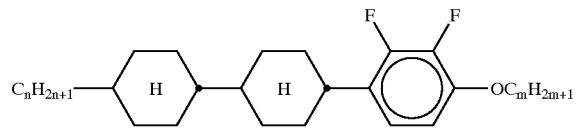

CCP-nmFF

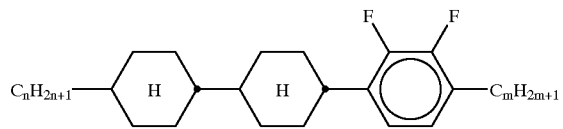

D-nOmFF

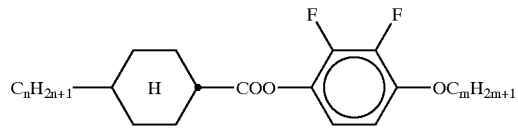

CBC-nmF

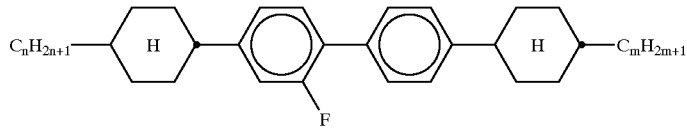

CBC-nm

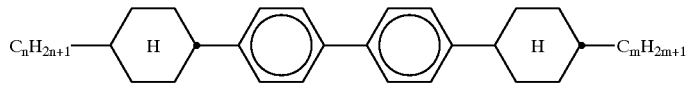

-continued
CCP-V-m
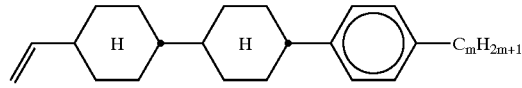
CCP-Vn-m
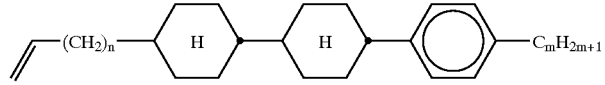
CPYC-n-m
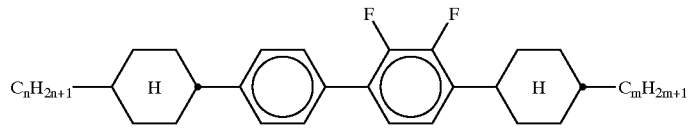
CYYC-n-m
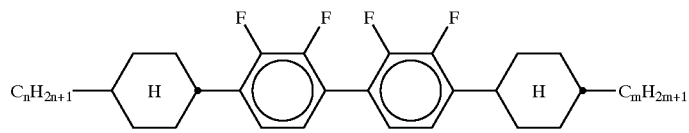
CCYY-n-(O)m
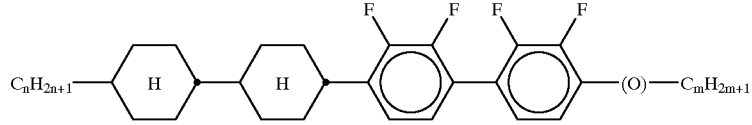
CCH-nOm
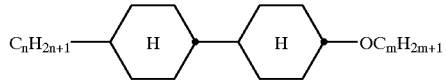
CY-n-m
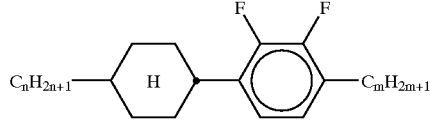
CCH-nm
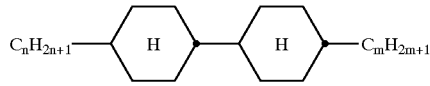
CC-n-V
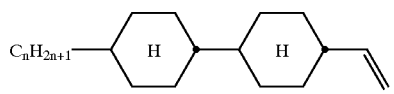
CC-n-V1
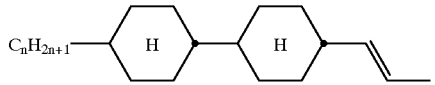
CP-nOmFF
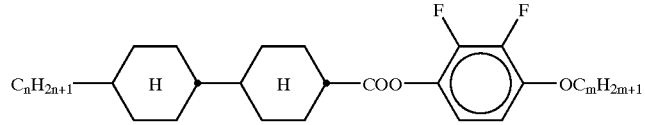
CH-nm
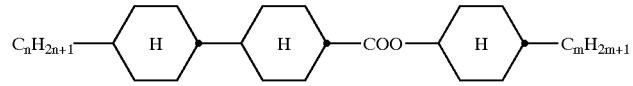
CEY-V-n
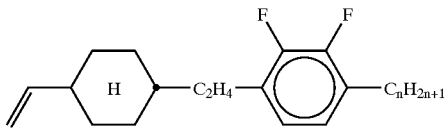

-continued
CVY-V-n 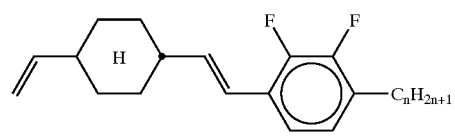
CY-V-On 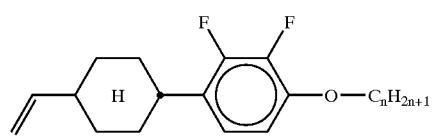
CY-n-O1V 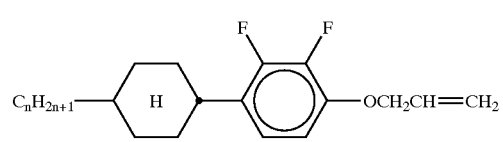
CY-n-OC(CH$_3$)=CH$_2$ 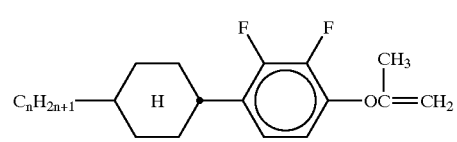
BCN-nm 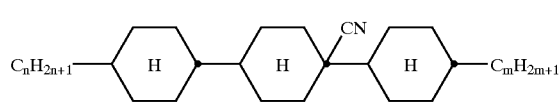
CCN-nm 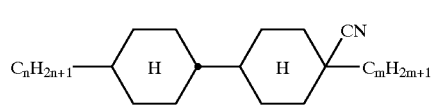
CY-n-OV 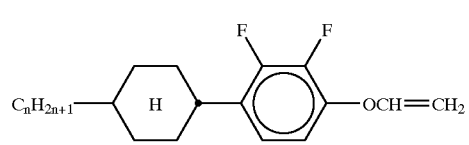
PCH-nm 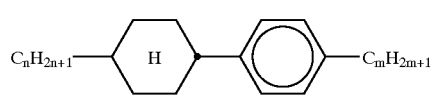
PCH-nOm 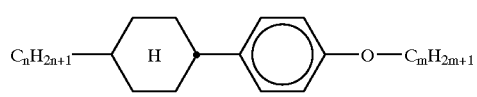
PGIGI-n-F 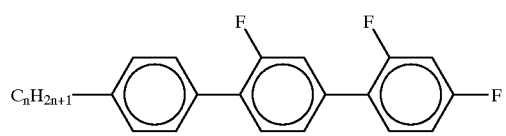
BCH-nm 
CCPC-nm 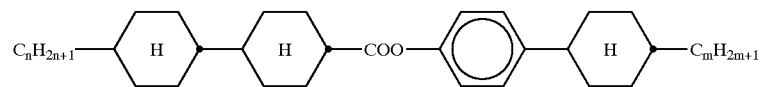
CCY-n-zOm 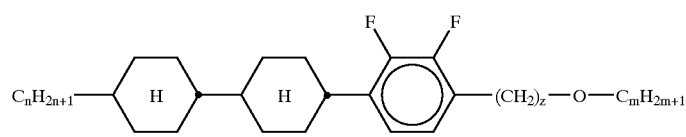

-continued
CPY-n-m
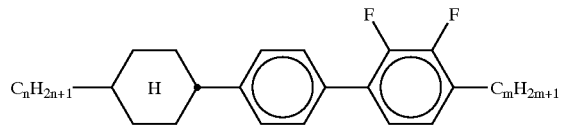
CPY-V-Om
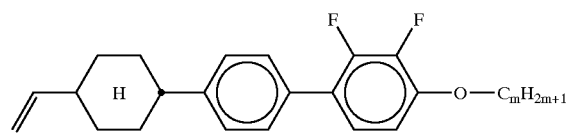
CPY-n-Om
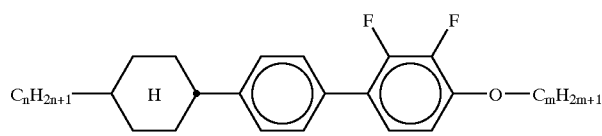
CQY-n-(O)m
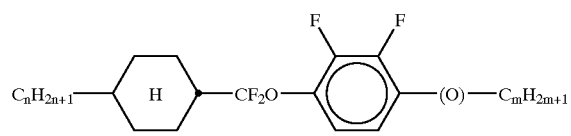
CQIY-n-(O)m
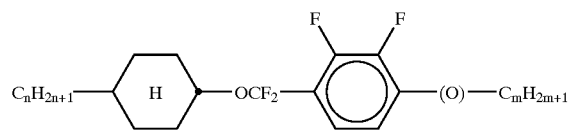
CCQY-n-(O)m
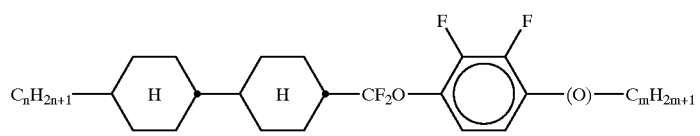
CCQIY-n-(O)m
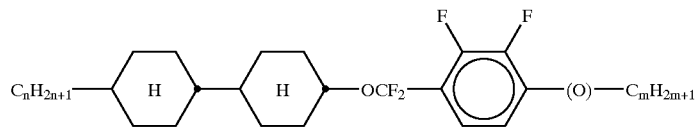
CPQY-n-(O)m
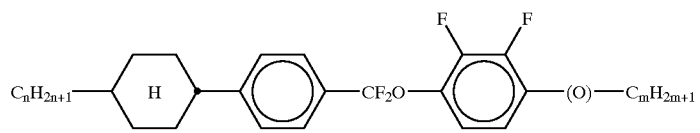
CPQIY-n-(O)m
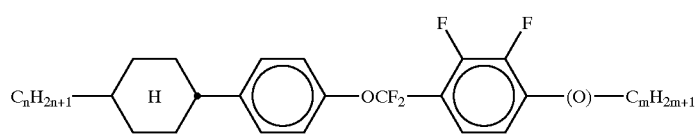
CCY-V-(O)m
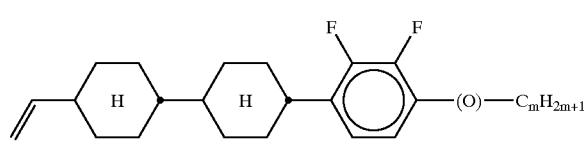
PPY-n-(O)m
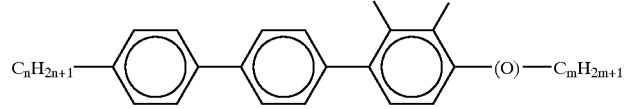

-continued

| | |
|---|---|
| PYP-n-(O)m | 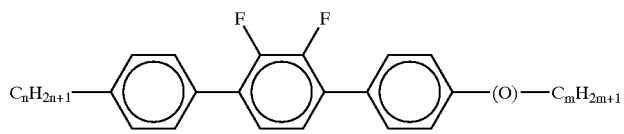 |

(n and m = 1–6; z = 1–6)

The following abbreviations are used:
$V_o$ capacitive threshold voltage [V] at 20° C.
Δn the optical anisotropy measured at 20° C. and 589 nm,
Δε the dielectric anisotropy at 20° C. and 1 kHz,
cl.p. clearing point [° C.]
γ1 rotational viscosity measured at 20° C. [mPa·s]
LTS low temperature stability.

The display used for measurement of the threshold voltage has two plane-parallel outer plates at a separation of 20 μm and electrode layers with SE-1211 (Nissan Chemicals) alignment layers on top on the insides of the outer plates, which effect a homeotropic alignment of the liquid crystals.

MIXTURE EXAMPLES

Example 1

| | | | |
|---|---|---|---|
| PCH-304FF | 12.0% | Clearing point [° C.]: | 69.5 |
| PCH-502FF | 8.0% | Δn [589 nm, 20° C.]: | +0.0920 |
| PCH-504FF | 15.0% | Δε [1 kHz, 20° C.]: | −3.7 |
| CCP-302FF | 6.0% | γ₁ [mPa.s, 20° C.]: | 111 |
| CPY-2-O2 | 11.0% | | |
| CPY-3-O2 | 12.0% | | |
| CCP-V-1 | 5.0% | | |
| CC-3-V1 | 12.0% | | |
| CCH-35 | 8.0% | | |
| CC-5-V | 5.0% | | |
| | 6.0% | | |

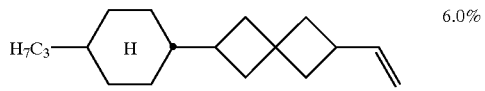

Example 2

| | | | |
|---|---|---|---|
| PCH-302FF | 16.0% | Clearing point [° C.]: | 74.5 |
| PCH-502FF | 12.0% | Δn [589 nm, 20° C.]: | +0.0838 |
| CCP-202FF | 12.0% | Δε [1 kHz, 20° C.]: | −3.9 |
| CCP-302FF | 11.0% | γ₁ [mPa.s, 20° C.]: | 107 |
| CCP-502FF | 6.0% | $V_o$ [V]: | 2.10 |
| CPY-2-O2 | 7.0% | $K_1$ [pN]: | 13.7 |
| CC-5-V | 20.0% | $K_3$ [pN]: | 15.4 |
| CC-3-V1 | 10.0% | LTS (test cells, −30° C.]: | nem. > 1000 h |
| | 6.0% | | |

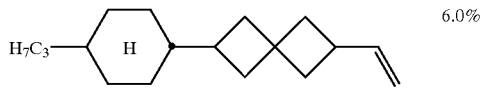

Example 3

| | | | |
|---|---|---|---|
| PCH-302FF | 16.0% | Clearing point [° C.]: | 75.0 |
| PCH-502FF | 12.0% | Δn [589 nm, 20° C.]: | +0.0822 |
| CCP-303FF | 10.0% | Δε [1 kHz, 20° C.]: | −3.7 |
| CCP-402FF | 8.0% | γ1 [mPa.s, 20° C.]: | 102 |
| CCP-302FF | 12.0% | V0 [V]: | 2.08 |
| CPY-2-O2 | 6.0% | | |
| CC-5-V | 20.0% | | |
| CC-3-V1 | 7.0% | | |

-continued

| | |
|---|---|
| 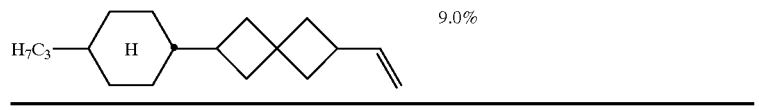 | 9.0% |

Example 4

| | | | |
|---|---|---|---|
| PCH-304FF | 10.0% | Clearing point [° C.]: | 81.5 |
| PCH-502FF | 20.0% | Δn [589 nm, 20° C.]: | +0.1098 |
| CCP-302FF | 8.0% | Δε [1 kHz, 20° C.]: | −3.8 |
| BCH-32 | 9.0% | γ1 [mPa.s, 20° C.]: | 138 |
| CPY-2-O2 | 12.0% | V0 [V]: | 2.10 |
| CPY-3-O2 | 12.0% | | |
| CC-3-V1 | 14.0% | | |
| 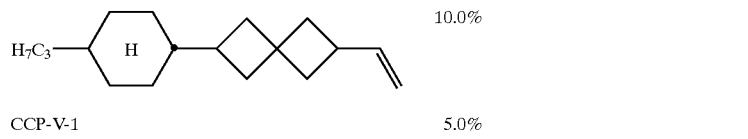 | 10.0% | | |
| CCP-V-1 | 5.0% | | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystalline medium comprising a mixture of polar compounds of negative dielectric anisotropy, which comprises at least one compound of the formula I

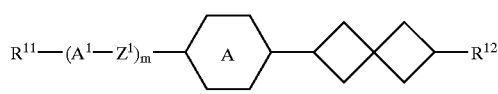

I in which
$R^{11}$ is an alkyl or alkenyl radical having 1 to 15 carbon atoms which is unsubstituted, monosubstituted by CN or $CF_3$ or monosubstituted to perhalo-substituted by halogen, where one or more $CH_2$ groups in these radicals are optionally replaced by —O—, —S—,

—C≡C—, —CO—O— or —O—CO— in such a way that O atoms are not linked directly to one another, $A^1$
a) is a 1,4-cyclohexenylene or 1,4-cyclohexylene radical, in which one or two non-adjacent $CH_2$ groups are optionally replaced by —O— or —S—,
b) a 1,4-phenylene radical, in which one or two CH groups are optionally replaced by N,
c) a radical selected from the group consisting of piperidine-1,4-diyl, 1,4-bicyclo[2.2.2]octylene, naphthalene-2,6-diyl, decahydronaphthalene-2,6-diyl, 1,2,3,4-tetrahydronaphthalene-2,6-diyl, phenanthrene-2,7-diyl and fluorene-2,7-diyl,
where the radicals a), b) and c) are optionally mono-substituted or polysubstituted by halogen atoms,

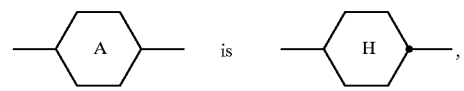

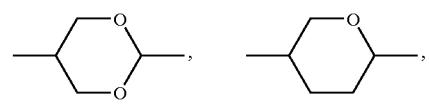

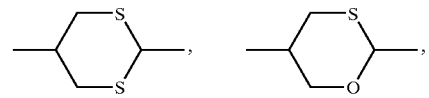

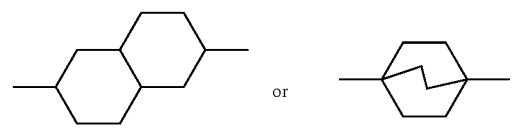

$Z^1$ is —CO—O—, —O—CO—, —$CF_2$O—, —O$CF_2$—, —$CH_2$O—, —O$CH_2$—, —$CH_2CH_2$—, —$(CH_2)_4$—, —$C_2F_4$—, —$CH_2CF_2$—, —$CF_2CH_2$—, —CH=CF—, —CF=CH—, —CF=CF—, —CH=CH—, —C≡C— or a single bond, $R^{12}$ is alkenyl having 2–7 carbon atoms, and m is 0, 1 or 2.

2. A liquid-crystalline medium according to claim 1, which additionally comprises one or more compounds of the formula II

II

[structure: R²—[H]ₚ—(2,3-difluorophenyl)—(O)C_vH_{2v+1}]

in which
- R² is an alkyl or alkenyl radical having 1 to 15 carbon atoms which is unsubstituted, monosubstituted by CN or CF₃ or monosubstituted to perhalo-substituted by halogen, where one or more CH₂ groups in these radicals are optionally each independently of one another, replaced by —O—, —S—, —C≡C—, —CO—, —CO—O—, —O—CO— or —O—CO—O— in such a way that O atoms are not linked directly to one another,
- p is 1 or 2, and
- v is from 1 to 6.

3. A liquid-crystalline medium according to claim 1, which additionally comprises one or more compounds of the formula III

III

[structure: R³¹—B—H—R³²]

in which
- R³¹ and R³² are each, independently of one another, a straight-chain alkyl, alkenyl, alkenyloxy or alkoxy radical having 1 to 12 carbon atoms, and —B— is —⌬— (phenyl) or —H— (cyclohexyl).

4. A liquid-crystalline medium according to claim 2, which additionally comprises one or more compounds of the formula III

III

[structure: R³¹—B—H—R³²]

in which
- R³¹ and R³² are each, independently of one another, a straight-chain alkyl, alkenyl, alkenyloxy or alkoxy radical having 1 to 12 carbon atoms, and —B— is —⌬— or

—H—.

5. A liquid-crystalline medium according to claim 1, which comprises two or more compounds of the formula I.

6. A liquid-crystalline medium according to claim 1, wherein the proportion of compounds of the formula I in the mixture as a whole is at least 5% by weight.

7. A liquid-crystalline medium according to claim 2, wherein the proportion of compounds of the formula II in the mixture as a whole is at least 20% by weight.

8. A liquid-crystalline medium according to claim 3, wherein the proportion of compounds of the formula III in the mixture as a whole is at least 5% by weight.

9. A liquid-crystalline medium according to claim 1, which comprises at least one compound selected from those of the formulae I1 to I8:

I1
[R¹¹—cyclohexyl—bicyclobutyl—R¹²]

I2
[R¹¹—cyclohexyl—cyclohexyl—bicyclobutyl—R¹²]

I3
[R¹¹—dioxanyl—bicyclobutyl—R¹²]

I4
[R¹¹—pyranyl—bicyclobutyl—R¹²]

I5
[R¹¹—cyclohexyl—dioxanyl—bicyclobutyl—R¹²]

I6
[R¹¹—dioxanyl—cyclohexyl—bicyclobutyl—R¹²]

I7
[R¹¹—decahydronaphthyl—bicyclobutyl—R¹²]

I8
[R¹¹—bicyclooctyl—bicyclobutyl—R¹²]

in which
R¹¹ and R¹² are as defined.

10. A liquid-crystalline medium according to claim 9, which additionally comprises one or more compounds of the formula II

II

[structure: R²—[H]ₚ—(2,3-difluorophenyl)—(O)C_vH_{2v+1}]

in which
R² is an alkyl or alkenyl radical having 1 to 15 carbon atoms which is unsubstituted, monosubstituted by CN or $CF_3$ or monosubstituted to perhalo-substituted by halogen, where one or more $CH_2$ groups in these radicals are optionally each independently of one another, replaced by —O—, —S—, —C≡C—, —CO—, —CO—O—, —O—CO— or —O—CO—O— in such a way that O atoms are not linked directly to one another, p is 1 or 2, and v is from 1 to 6.

11. A liquid-crystalline medium according to claim 9, which consists essentially of 5–30% by weight of one or more compounds of the formula I1 and 20–70% by weight of one or more compounds of the formula II.

12. An electro-optical display having active matrix addressing based on the ECB or IPS effect, which comprises, as dielectric, a liquid-crystalline medium according to claim 1.

13. An electro-optical display having active matrix addressing based on the ECB or IPS effect, which comprises, as dielectric, a liquid-crystalline medium according to claim 2.

14. An electro-optical display having active matrix addressing based on the ECB or IPS effect, which comprises, as dielectric, a liquid-crystalline medium according to claim 3.

15. An electro-optical display having active matrix addressing based on the ECB or IPS effect, which comprises, as dielectric, a liquid-crystalline medium according to claim 10.

16. An electro-optical display having active matrix addressing based on the ECB or IPS effect, which comprises, as dielectric, a liquid-crystalline medium according to claim 11.

* * * * *